United States Patent
Spoor (10) Patent No.: US 9,074,648 B2
(45) Date of Patent: Jul. 7, 2015

(54) BRAKING MECHANISM

(71) Applicant: Steelcase Inc., Grand Rapids, MI (US)

(72) Inventor: Travis Spoor, Grand Rapids, MI (US)

(73) Assignee: Steelcase Inc., Grand Rapids, MI (US)

( * ) Notice: Subject to any disclaimer, the term of this patent is extended or adjusted under 35 U.S.C. 154(b) by 448 days.

(21) Appl. No.: 13/650,255

(22) Filed: Oct. 12, 2012

(65) Prior Publication Data

US 2014/0102834 A1    Apr. 17, 2014

(51) Int. Cl.
| | |
|---|---|
| *F16D 65/28* | (2006.01) |
| *B62B 9/08* | (2006.01) |
| *B62B 5/04* | (2006.01) |
| *B60B 33/00* | (2006.01) |
| *B60T 11/04* | (2006.01) |
| *F16D 125/60* | (2012.01) |

(52) U.S. Cl.
CPC ............... *F16D 65/28* (2013.01); *B62B 9/082* (2013.01); *F16D 2125/60* (2013.01); *B62B 9/087* (2013.01); *B62B 5/0433* (2013.01); *B62B 5/0457* (2013.01); *B60B 33/0078* (2013.01); *B60T 11/046* (2013.01)

(58) Field of Classification Search
CPC . F16D 65/28; F16D 2125/60; F16D 2125/62; B60T 11/046; B60T 7/04; B60T 7/045; B60B 33/078; B60B 33/0081; B60B 33/0092; A61G 1/0287; A61G 2007/0528; B62B 5/0433; B62B 5/0457; B62B 5/0461; B62B 9/082; B62B 9/087
USPC ........ 188/2 D; 74/524, 512, 539; 5/600, 86.1; 70/192–193, 225, 228
See application file for complete search history.

(56) References Cited

U.S. PATENT DOCUMENTS

| | | |
|---|---|---|
| 2,684,734 A | 7/1954 | Wilson |
| 3,409,105 A | 11/1968 | Clinton |
| 3,411,376 A | 11/1968 | Klaus et al. |
| 3,571,842 A | 3/1971 | Fricke |
| 3,890,669 A | 6/1975 | Reinhards |
| 3,911,525 A | 10/1975 | Haussels |
| 4,149,433 A | 4/1979 | Schroter |
| 4,248,444 A | 2/1981 | Johnson |
| 4,276,962 A | 7/1981 | Aulik |
| 4,414,702 A | 11/1983 | Neumann |
| 4,417,648 A | 11/1983 | Anderson et al. |
| 4,479,566 A | 10/1984 | Ishii |
| 4,526,253 A | 7/1985 | Schmidt |
| 4,641,545 A | 2/1987 | Rabe |
| 4,722,114 A | 2/1988 | Neumann |

(Continued)

FOREIGN PATENT DOCUMENTS

| | | |
|---|---|---|
| EP | 422376 A1 | 4/1991 |
| JP | 2009286370 A | 12/2009 |
| JP | 2010143290 A | 7/2010 |

*Primary Examiner* — Anna Momper (57) ABSTRACT

A braking mechanism operably engaging at least one wheel where the mechanism is capable of transitioning the at least one wheel between unlocked and locked states is provided. The braking mechanism includes a flipper and a cam. The flipper is adapted to move in X, Y and Z-directions and includes a discontinuous track having an open slot portion and a surface path portion. The open slot portion includes a home position and an engaged position. The cam includes a pin which cooperatively moves along the discontinuous track. When the at least one wheel is in an unlocked state, the pin is in the home position and when the at least one wheel is in a locked state, the pin is in the engaged position.

20 Claims, 7 Drawing Sheets

(56) References Cited

U.S. PATENT DOCUMENTS

| | | |
|---|---|---|
| 4,793,207 A | 12/1988 | Old |
| 4,793,445 A | 12/1988 | Collignon et al. |
| 4,815,161 A | 3/1989 | Timmer et al. |
| 4,922,574 A | 5/1990 | Heiligenthal et al. |
| 5,133,106 A | 7/1992 | Milbredt et al. |
| 5,139,116 A | 8/1992 | Screen |
| 5,181,587 A | 1/1993 | Masatoshi |
| 5,205,381 A | 4/1993 | Mehmen |
| 5,232,071 A | 8/1993 | Kawanabe |
| 5,244,062 A | 9/1993 | Felton |
| 5,303,450 A | 4/1994 | Lange |
| 5,368,133 A | 11/1994 | Yang |
| 5,579,871 A | 12/1996 | Emmrich et al. |
| 5,634,532 A | 6/1997 | Bucher |
| 5,832,784 A | 11/1998 | McCallips et al. |
| 5,913,942 A | 6/1999 | Roehling |
| 5,979,917 A | 11/1999 | Thogersen et al. |
| 6,047,609 A | 4/2000 | Brower et al. |
| 6,286,183 B1 | 9/2001 | Stickel et al. |
| 6,409,187 B1 | 6/2002 | Crow, Jr. |
| 6,575,052 B2 | 6/2003 | Toennesland et al. |
| 6,584,641 B1 | 7/2003 | Milbredt |
| 6,810,560 B1 | 11/2004 | Tsai |
| 7,059,452 B2 | 6/2006 | Chen |
| 7,175,002 B2 | 2/2007 | Chiang |
| 7,367,432 B2 | 5/2008 | Chen |
| 7,406,745 B2 | 8/2008 | Chou |
| 7,698,760 B2 | 4/2010 | Reckelhoff et al. |
| 7,708,119 B2 | 5/2010 | Chen |
| 7,810,613 B2 | 10/2010 | Lin |
| 7,810,822 B2 | 10/2010 | Figel et al. |
| 7,922,182 B2 | 4/2011 | Van der Vegt |
| 8,016,301 B2 * | 9/2011 | Figel et al. .................. 280/47.38 |
| 8,794,391 B2 * | 8/2014 | Tseng ........................ 188/24.13 |
| 2002/0066332 A1 | 6/2002 | Horikawa |
| 2007/0056141 A1 | 3/2007 | Armano et al. |
| 2007/0144303 A1 | 6/2007 | Sato et al. |
| 2011/0101636 A1 | 5/2011 | Faulhaber |
| 2013/0174377 A1 * | 7/2013 | Lin et al. ....................... 16/35 R |

* cited by examiner

# BRAKING MECHANISM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a brake activation mechanism, more particularly, to a brake activation mechanism for movable furniture, such as chairs, beds, tables and the like. Although the following discussion relates to movable chairs, the present invention extends to all pieces of movable furniture on wheels.

Wheels are used on movable furniture, such as chairs, to allow for easy movement of the chair even while a person is seated in it. It is often desired to lock the wheels to secure the movable furniture when it is not being moved by a user. For example, a chair is equipped with caster wheels to allow a healthcare professional or other caretaker to easily move furniture, but locked casters are desired when a person is getting in and out of the chair or when the chair and person are not attended by a healthcare professional or other caretaker. Accordingly, pieces of movable furniture with casters may also include a braking mechanism. Users of the movable chairs, beds, and tables require a fast and simple way to activate and deactivate these caster brakes.

For example in healthcare, caretakers have faced a number of challenges when dealing with movable furniture. One of those challenges has been the need to bend down to activate and deactivate the braking mechanism, and not having a stable hold on the chair, bed, or table while doing so. This is inconvenient for both caretakers and patients alike.

Caretakers often are not able to activate and deactivate the braking mechanism on both sides of the piece of furniture. This is inconvenient for the caretakers, and can create difficulties when transferring patients in and out of a movable chair because the activation device may be between the chair and another piece of furniture or too close to a wall, and therefore not accessible. Furthermore, braking mechanisms having one lever to activate the caster brakes and another lever to deactivate the caster brakes are cumbersome and confusing to users, especially in emergency situations.

Thus, a brake activation mechanism that allows a user to maintain a hold on a piece of movable furniture during activation and to access an activation/deactivation pedal from both sides of the furniture is activated is desired.

BRIEF SUMMARY OF THE INVENTION

In one embodiment of the present invention, a braking mechanism operably engages at least one wheel and can transition the at least one wheel between unlocked and locked states. The braking mechanism includes a flipper and a cam. The flipper includes a discontinuous track having an open slot portion and a surface path portion. The open slot portion includes a home position and an engaged position. The cam includes a pin which cooperatively moves along the discontinuous track. In the unlocked state, the pin is located in the home position. As the at least one wheel transitions from the unlocked state to the locked state, the pin moves along the open slot portion from the home position to the engaged position. As the at least one wheel transitions from the locked state to the unlocked state, the pin moves along the open slot portion and then along the surface path portion from the engaged position to the home position.

In another embodiment of the present invention, a braking mechanism includes at least one pedal, a connecting rod, a flipper, a cam, a cable junction and cables. The at least one pedal is fixed to an end of the connecting rod. The flipper is movable in X, Y and Z-directions and includes a discontinuous track. The cam is attached to the connecting rod and includes a pin cooperatively movable within the discontinuous track. The cable junction is attached to the connecting rod. Each cable includes one end attached to the cable junction and a second end engaging a brake.

In yet another embodiment of the present invention, a supporting platform includes a chassis, a plurality of wheels attached to an underside of the chassis, and a mechanism operatively connected to the plurality of wheels. Each wheel includes a brake and the mechanism is capable of transitioning the wheels between locked and unlocked states. The mechanism includes a connecting rod, an activation subassembly and a cable junction attached to the connecting rod, and a pedal fixed to a connecting rod end. The activation subassembly includes a plate fixed to the chassis, a flipper having a discontinuous track, a spring biased rod pivotally connecting the plate and flipper, and a cam fixed to the connecting rod. The cam includes a pin which cooperatively travels within the discontinuous track.

BRIEF DESCRIPTION OF THE DRAWINGS

The foregoing and other items and advantages of the present invention will be appreciated more fully from the following figures, where like reference characters designate like features in which.

DETAILED DESCRIPTION OF THE INVENTION

For purposes of description herein, it is to be understood that the specific devices illustrated in the attached drawings, and described below are simply exemplary embodiments of the invented concepts. Hence, specific dimensions and other physical characteristics relating to the embodiments disclosed herein are not to be considered as limiting. Also, components described hereinafter as making up various elements of the invention are intended to be illustrative and not limiting. Many suitable components that would perform the same or similar functions as the components described herein are intended to be considered within the scope of the invention.

Figure 1:
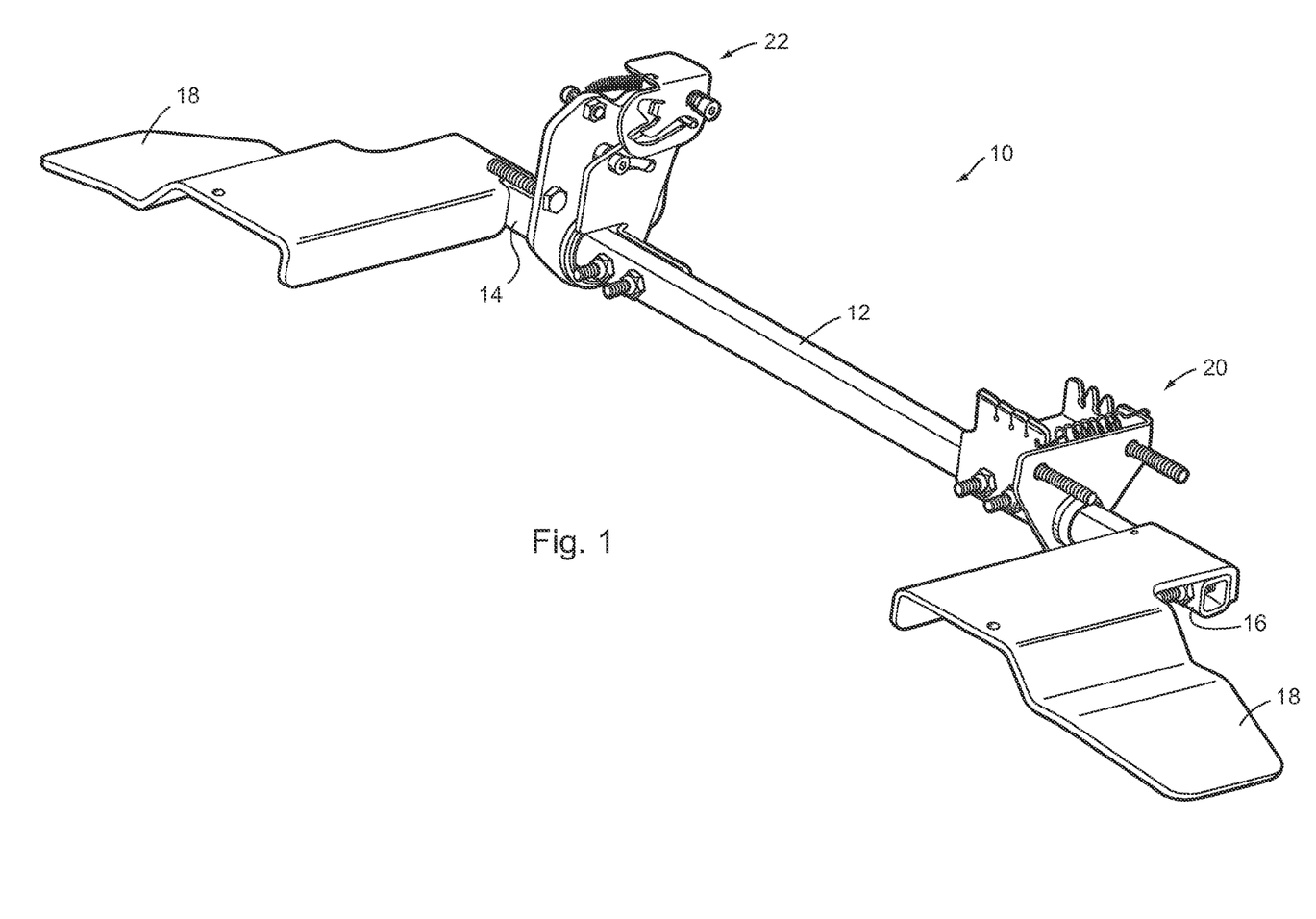
FIG. 1 is a perspective view of the braking activation mechanism in one embodiment of the invention, the brake activation mechanism including a cable junction and an activation subassembly.
Figure 2:
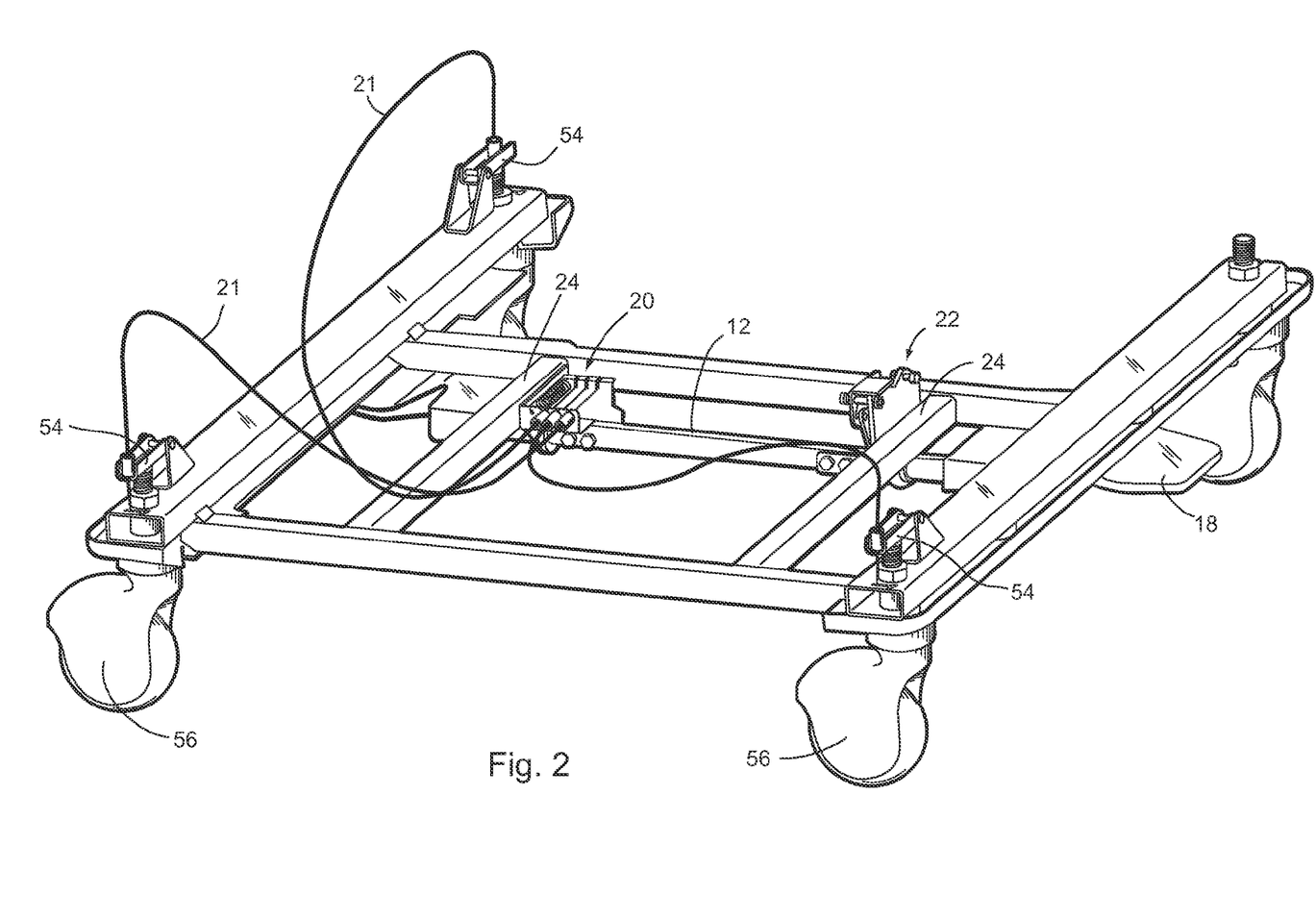
FIG. 2 is a perspective view of the braking activation mechanism of FIG. 1 attached to a movable chassis.
Figure 3:
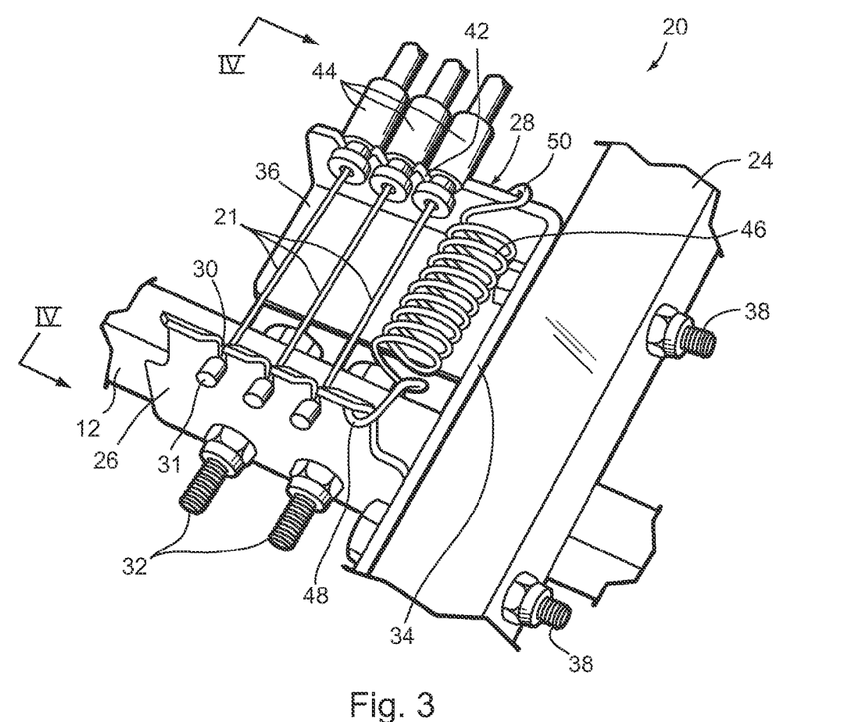
FIG. 3 is a top perspective view of the cable junction of the braking activation mechanism of FIG. 1.

Referring to FIG. 1, the present brake activation mechanism 10 includes a connecting rod 12 having a first end 14 and a second end 16; at least one pedal 18 attached to the connecting rod; a cable junction 20 and an activation sub assembly 22. As illustrated in FIG. 2, the brake activation mechanism 10 can be attached to a chassis 24. The chassis 24 can be attached to a supporting platform of a chair, a bed, a table, or any other movable product.

Referring to FIGS. 1 and 2, the connecting rod 12 may be any shape, but preferably includes at least one planar surface. In one embodiment, the connecting rod 12 is a tube having a square cross section. The connecting rod 12 is attached to a chassis 24 and spans a width of the chassis. In an exemplary embodiment, the connecting rod 12 is attached to an underside of the chassis 24. At least one pedal 18 is fixed to an end of the connecting rod 12 and preferably, a pedal 18 is fixed to the first end 14 of the connecting rod 12 and a pedal is fixed to the second end 16 of the connecting rod. The pedal 18 extends slightly from underneath a side of the chassis 24. The pedal may be any shape, but preferably has a flat paddle shape for easy foot access. In an exemplary embodiment, the cable junction 20 and actuation subassembly 22 are positioned toward opposite ends 14, 16 of the connecting rod 12. However, the cable junction 20 and activation subassembly 22 can be positioned anywhere on the connecting rod 12.

Figure 6:
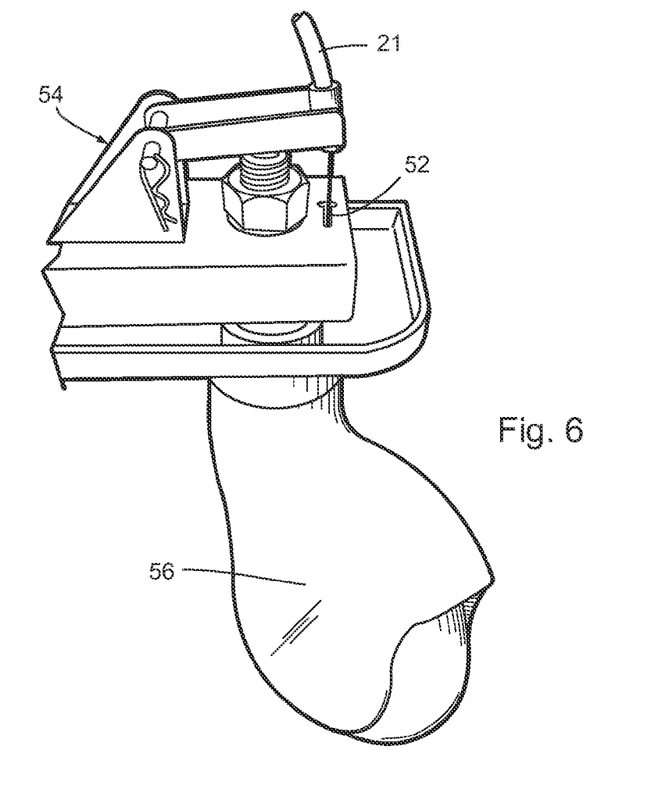
FIG. 6 is a side perspective view of a portion of FIG. 2, showing a braked caster.

Now referring to FIGS. 1 and 3-6, the cable junction 20 holds a plurality of brake cables 21 and includes a first cable holding portion 26 and a second cable holding portion 28. The first cable holding portion 26 of the cable junction 20 includes slits 30 at a top edge and fastening apertures at a bottom end. First ends 31 of the plurality of brake cables 21 fit in the slits 30 and are held there. Fasteners 32, such as bolts, pass through the fastening apertures at the bottom end of the first cable holding portion 26 to secure the first cable holding portion of the cable junction 20 to the connecting rod 12. The second cable holding portion 28 of the cable junction 20 includes a V-shaped plate 34 and an adjacent attached L-shaped bracket 36. The V-shaped plate 34 is attached to the chassis 24 by fasteners 38, such as bolts, and is apertured to contain a bearing 40 that surrounds the connecting rod 12 at a first bearing point. The L-shaped bracket 36 contains notches 42 for supporting brake cable end fittings 44 through which the plurality of brake cables 21 pass. A spring 46 having a first end 48 and a second end 50 is connected at its first end 48 to the first cable holding portion 26 and at its second end 50 to the second cable holding portion 28. As illustrated in FIG. 6, second ends 52 of the plurality of brake cables 21 are operatively attached to a plurality of brakes 54. In a preferred embodiment, the brakes 54 are attached to wheels such as casters 56.

Figure 7:
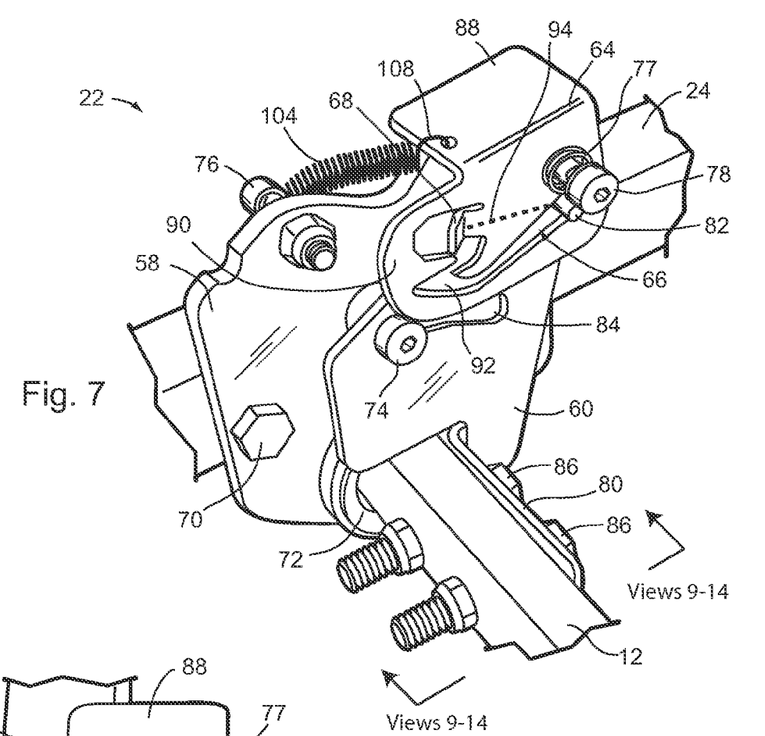
FIG. 7 is a side perspective view of the activation subassembly of the braking activation mechanism of FIG. 1, the activation subassembly including a pin and a discontinuous track.
Figure 8:
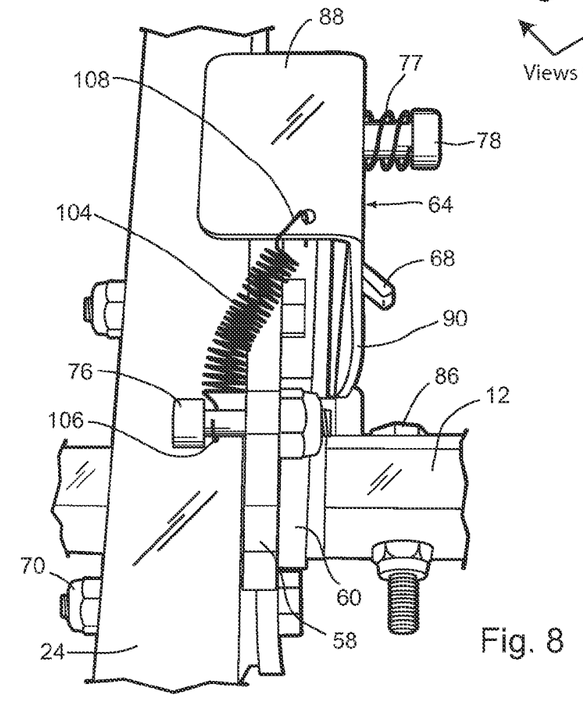
FIG. 8 is a top view of the activation subassembly of FIG. 7.

As illustrated in FIGS. 7 and 8, the activation subassembly 22 includes a plate 58, a cam 60, a flipper 64 having a discontinuous track 66 and ramp 68. The plate 58 is fixed to the chassis 24 by fasteners 70, such as bolts, and apertured to contain a bearing 72 that surrounds the connecting rod 12 at a second bearing point. The plate 58 further includes a guide rod 74, a spring connection rod 76, and a spring 77 biased rod 78. The guide rod 74 protrudes from a center of the plate 58 towards the center of the brake activation mechanism 10. The spring connection rod 76 protrudes from an upper portion of the plate 58 away from the center of the mechanism 10. The spring 77 biased rod 78 protrudes from the plate 58 toward the center of the mechanism 10.

Referring to FIG. 7, the cam 60 includes a tab 80 at its lower end, a pin 82 at its upper end, and a guide track 84 proximate its center. The tab 80 is apertured to allow fasteners 86, such as bolts, to pass there through and fix the cam 60 to the connecting rod 12. The pin 82 protrudes from the cam 60 towards the center of the mechanism 10. The pin 82 travels along a path defined by the discontinuous track 66 of the flipper 64. The guide track 84 houses the guide rod 74 that is fixed to the plate 58. The guide rod 74 moves in the guide track 84 to maintain the position of the cam 60 relative to the plate 58.

Still referring to FIG. 7, the flipper 64 includes an upper portion 88 and a lower portion 90. The lower portion 90 of the flipper 64 is positioned at the upper end of the cam 60 on the side of the cam that is closest to the center of the mechanism 10. The lower portion 90 includes the discontinuous track 66, the ramp 68, and an aperture. The spring 77 biased rod 78 protruding from the plate 58 passes through the aperture to loosely and pivotably connect the flipper 64 to the plate. The discontinuous track 66 is a complete and closed loop including two types of track, namely an open slot portion 92 and a surface path portion 94. The open slot portion 92 of the discontinuous track 66 includes a home position 96 and bends which define a first temporary stop position 98, an engaged position 100 and a second temporary stop position 102. The home position 96, first temporary stop position 98, engaged position 100 and secondary temporary stop position 102 function as stop points for the pin 82. The home position 96 is located at one end of the open slot portion 92 of the discontinuous track 66 and the ramp 68 is located at an opposite end of the open slot portion. The ramp 68 operates to transition the pin 82 from the open slot portion 92 to the surface path portion 94 of the discontinuous track 66. The surface path portion 94 is defined by a route connecting the ramp 68 and home position 96 in the open slot portion 92. The surface path portion 94 is located on a planar surface of the lower portion 90 of the flipper 64 which faces the plate 58. The upper portion 88 of the flipper 64 is positioned over the cam 60 and the plate 58, away from the center of the mechanism 10. As best illustrated in FIG. 8, a spring 104 connects the plate 58 spring connection rod 76 to the flipper 64 upper portion 88. In particular, a first end 106 of spring 104 engages the spring connection rod 76 and a second end 108 engages the upper portion 88.

Figure 4:
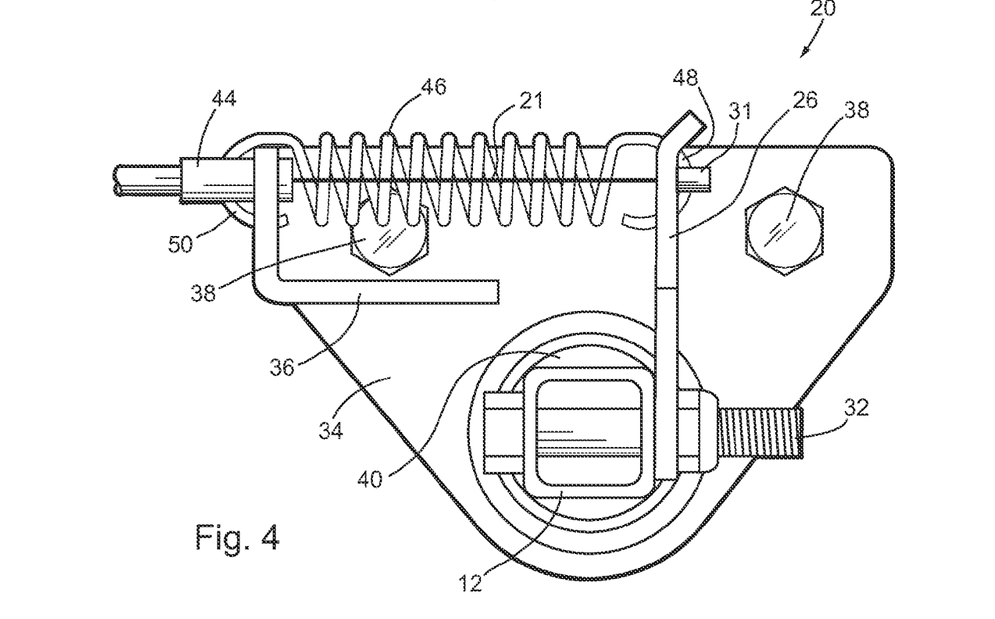
FIG. 4 is a side view of the cable junction of FIG. 3 when the braking activation mechanism is in an unlocked state.
Figure 5:
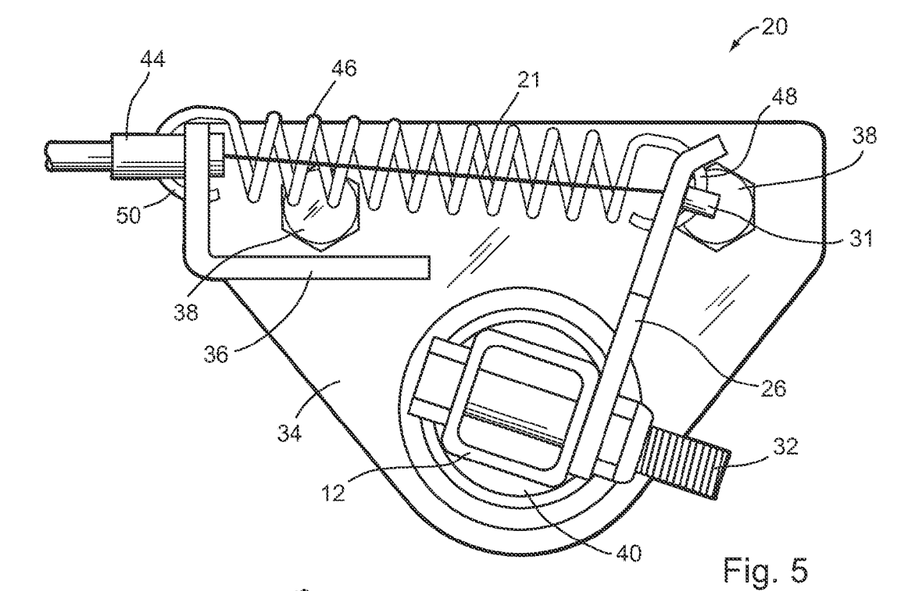
FIG. 5 is a side view of the cable junction of FIG. 3 when the braking activation mechanism is in a locked state.
Figure 9:
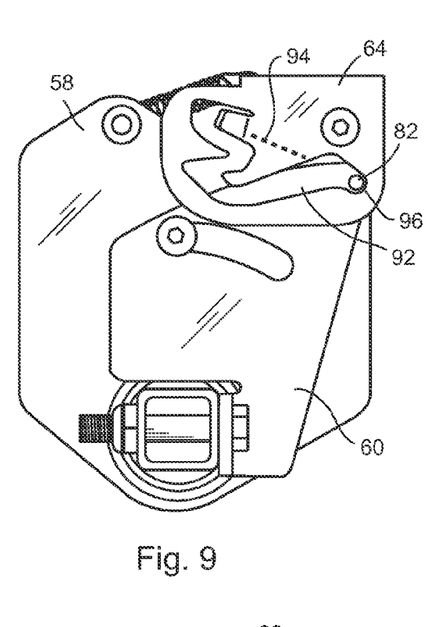
FIG. 9 is a schematic side view of the activation subassembly of FIG. 7, where the braking activation mechanism is in the unlocked stated and the pin is in a home position of the discontinuous track.
Figure 10:
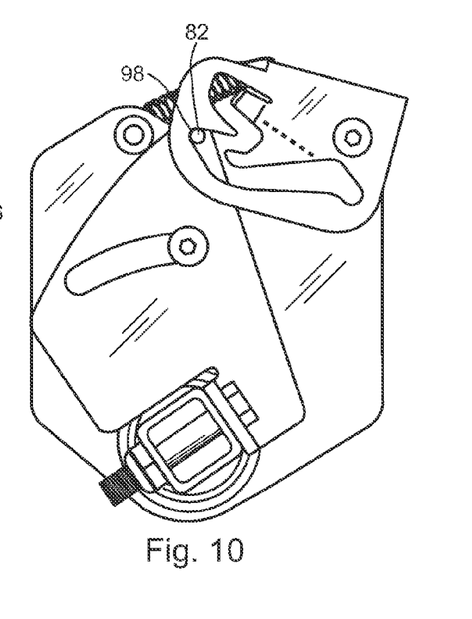
FIG. 10 is a schematic side view of the activation subassembly of FIG. 7, where the braking activation mechanism is being activated and the pin is in a first temporary stop position of the discontinuous track.

When the brake activation mechanism 10 is deactivated, the chassis 24 is movable and the at least one pedal 18 is parallel with the floor. The first and second cable holding parts 26, 28 of the cable junction 20 are perpendicular to the floor and parallel to each other as illustrated in FIG. 4. Referring to FIG. 9, the pin 82 is in the home position 92 in the discontinuous track 66 of the flipper 64.

Figure 11:
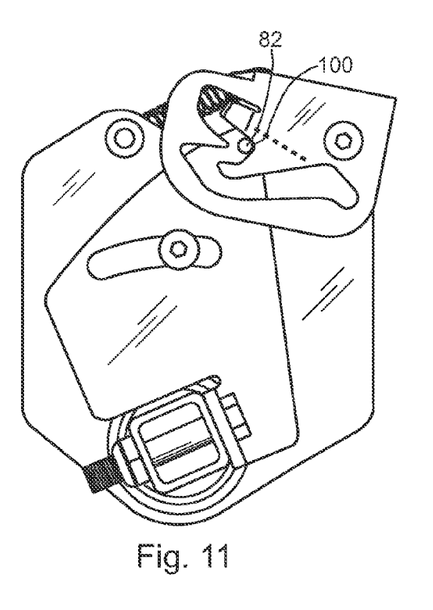
FIG. 11 is a schematic side view of the activation subassembly of FIG. 7, where the braking activation mechanism is in the locked state and the pin is in an engaged position of the discontinuous track.

To activate the brake activation mechanism 10, a user depresses a pedal 18. The pedal 18 rotates downward relative to the connecting rod 12 forming an acute angle with the floor. Where there is a pedal 18 located on opposite sides of the chassis, the user only needs to push one of the pedals which causes both pedals to rotate downward. For clarity, activation and deactivation of the brake activation mechanism are described in terms of one pedal, but it is to be understood that the mechanism may include two pedals. Because the pedal 18 is fixed to the connecting rod 12, the connecting rod also rotates. As the connecting rod 12 rotates, the cam 60 which is fixed to the connecting rod, also rotates. As illustrated in FIGS. 9-14, rotation of the cam 60 causes the pin 82 to move along the discontinuous track 66 of the flipper 64. First, the user steps on the pedal 18, which moves the pin 82 from the home position 96 (FIG. 9) to a first temporary stop position 98 (FIG. 10) in the open slot portion 92 of the discontinuous track 66, thereby stretching the spring 104 between the flipper 64 and the plate 58. The stretch of the spring 104 and movement of the spring over the plate 58 provides audible feedback to the user to signal that the brake activation mechanism 10 will engage. Concomitantly, the first cable holding portion 26 of the cable junction 20, which is fixed to the connecting rod 12, also rotates with the pedal 18 and connecting rod. The first cable holding portion 26 rotates away from the second cable holding portion 28 of the cable junction 20, thereby creating an obtuse angle between the lower ends of the first and second cable holding portions. When the user then removes his or her foot from the pedal 18, the pedal slightly rotates back up away from the floor, but still maintains a rotated position relative to the floor. As the pedal 18 rotates slightly back, the connecting rod 12 also rotates slightly, which causes the pin 82 on the cam 60 to snap up from the first temporary stop position 98 (FIG. 10) to the engaged position 100 (FIG. 11). The first cable holding portion 26 of the cable junction 20 remains angled away from the second cable holding portion 28, thereby forming an obtuse angle between the lower ends of the first and second cable holding portions and holding tension in the plurality of braking cables 21. Tension in the plurality of braking cables 21 causes the brakes 54 to be activated and lock the caster wheels 56. The rotated position of the at least one pedal 18 is a visible indication to the user that the brakes 54 are engaged and the caster wheels 56 are locked. In one embodiment, three caster wheels 56 are equipped with brakes 54 to prevent any movement of the chassis 24 when the brakes are engaged.

Figure 12:
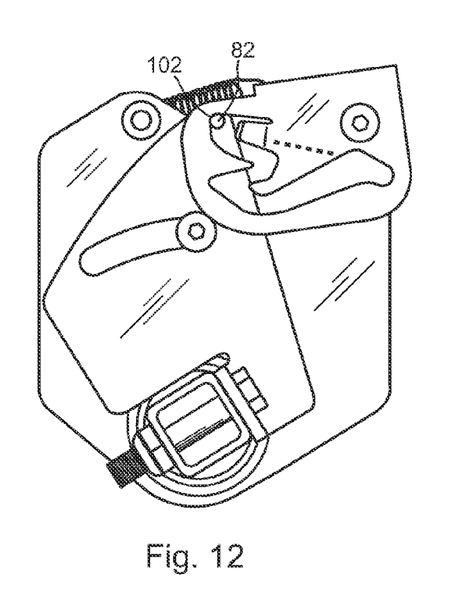
FIG. 12 is a schematic side view of the activation subassembly of FIG. 7, where the braking activation mechanism is being activated and the pin is in a second temporary stop position of the discontinuous track.
Figure 13:
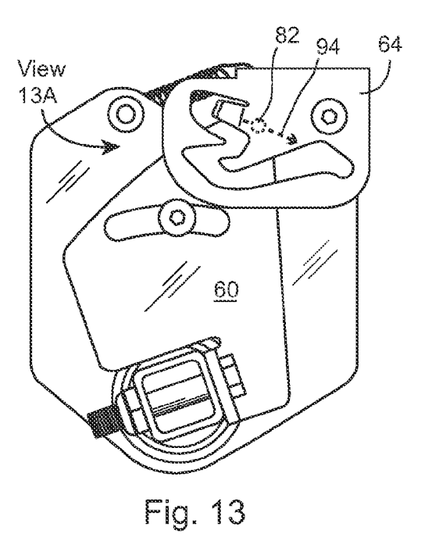
FIG. 13 is a schematic side view of the activation subassembly of FIG. 7, where the braking activation mechanism is being activated and the pin is traveling along a surface path portion of the discontinuous track.
Figure 13A:
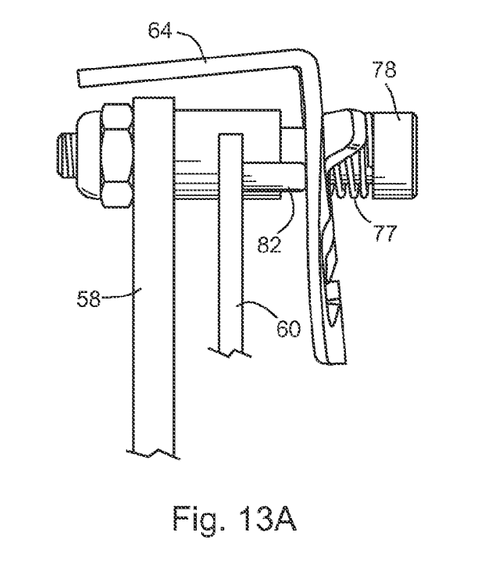
FIG. 13A is a cutaway end view of the activation subassembly of FIG. 13.
Figure 14:
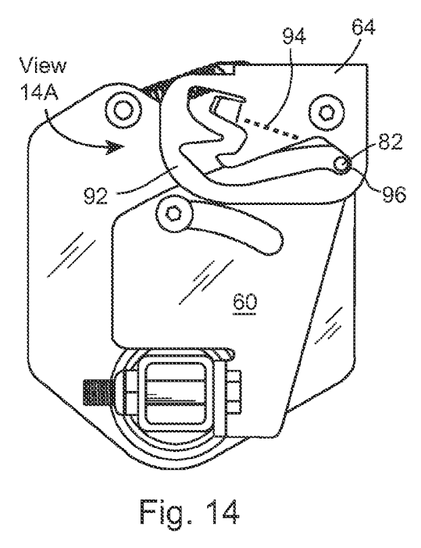
FIG. 14 is a schematic side view of the activation subassembly of FIG. 7, where the braking activation mechanism is in the unlocked stated and the pin is in the home position of the discontinuous track.
Figure 14A:
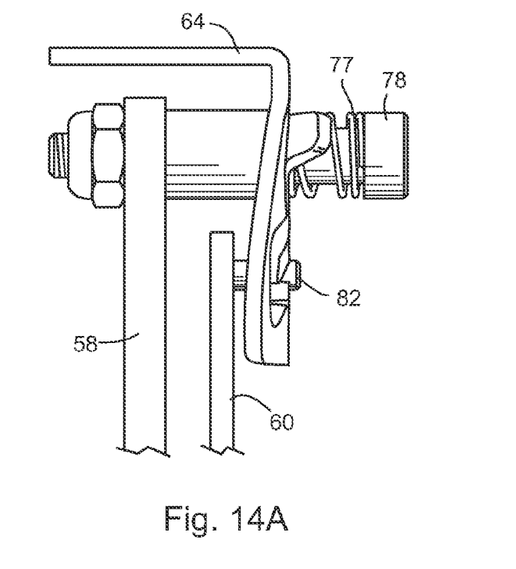
FIG. 14A is a cutaway end view of the activation subassembly of FIG. 14.

To deactivate the brake activation mechanism 10, the user again steps downward on pedal 18. This downward motion rotates the cam 60 with the connecting rod 12 causing the pin 82 to move out of the engaged position 100 (FIG. 11) in the open slot portion 92 of the discontinuous track 66 and to a second temporary stop position 102 (FIG. 12). Movement of the pin 82 on the cam 60 to the second temporary stop position 102 stretches the spring 104 between the flipper 64 and the plate 58, which again provides audible feedback to the user to signal the deactivation of the brake activation mechanism 10. When the user removes their foot from the pedal 18, the pedal 18 rotates up away from the floor which causes the connecting rod 12 to rotate, thereby rotating the cam 60. The rotating cam 60 moves the pin 82 through the open slot portion 92 of the discontinuous track 66 toward the ramp 68. Referring to FIG. 13A, when the pin 82 contacts the ramp 68, the ramp forces the flipper 64 to translate on the spring 77 biased rod 78 away from the pin 82, cam 60, and plate 58. The pin 82 travels up the ramp 68, behind the flipper and onto the surface path portion 94 of the discontinuous track 66 (FIG. 13), and returns to the home position 96 (FIG. 14). As soon as the pin 82 reaches the home position 96, the spring 77 between the flipper 64 and the plate 58 forces the flipper back into alignment with the pin in its home position (FIGS. 14 and 14A). The first cable holding portion 26 of the cable junction 20 also returns to its deactivated position of being perpendicular to the floor releasing tension in the plurality of braking cables 21. Release of the tension in the plurality of braking cables 21 causes the brakes 54 to be deactivated and unlock the caster wheels 56. The unrotated position of the at least one pedal 18 is a visible indication to the user that the brakes 54 are disengaged and the caster wheels 56 are unlocked.

As described in detail above, the flipper 64 is adapted to include three degrees of motion which facilitates movement of the pin 82 along the discontinuous track 66. As illustrated in FIGS. 9-12, the flipper 64 moves in an X-Y direction parallel to plate 58 as the pin 82 travels along the open slot portion 92 of the discontinuous track 66. As illustrated in FIGS. 13 and 13A, when the pin 82 contacts the ramp 68 and travels along the surface path portion 94 of the discontinuous track 66, the flipper 64 additionally translates in a Z-direction away from plate 58. Movement in the Z-direction is limited by upper portion 88 of the flipper 64 coming into contact with plate 58. Referring to FIGS. 14 and 14A, when the pin 82 reaches home position 96, the flipper 64 again translates in a Z-direction toward the plate 58.

The invention claimed is:

1. A braking mechanism operably engaging at least one wheel, the mechanism capable of transitioning the at least one wheel between unlocked and locked states and comprising:
   a flipper including a discontinuous track having an open slot portion and a surface path portion, the open slot portion including a home position and an engaged position; and
   a cam including a pin which cooperatively moves along the discontinuous track;
   wherein the unlocked state comprises the pin located in the home position,
   wherein transitioning the at least one wheel from the unlocked state to the locked state comprises the pin moving along the open slot portion from the home position to the engaged position; and
   wherein transitioning the at least one wheel from the locked state to the unlocked state comprises the pin moving along the open slot portion and then along the surface path portion from the engaged position to the home position.

2. The braking mechanism of claim 1, wherein the flipper is movable in X, Y and Z directions.

3. The braking mechanism of claim 2, wherein the flipper further comprises a ramp positioned between the open slot portion and the surface path portion, and wherein the pin travels along the ramp from the open slot portion to the surface path portion.

4. The braking mechanism of claim 1, further comprising a plate and a spring biased rod pivotally connecting the plate and flipper.

5. The braking mechanism of claim 2, further comprising a plate and a spring biased rod pivotally connecting the plate and flipper.

6. A mechanism operatively connected to a plurality of wheels, the mechanism capable of transitioning the plurality of wheels between locked and unlocked states, the mechanism including:
- a connecting rod having a first end and a second end;
- an activation subassembly attached to the connecting rod;
- a cable junction attached to the connecting rod; and
- a pedal fixedly attached to the connecting rod first or second end;

wherein the activation subassembly includes:
- a plate;
- a flipper including a closed loop having an open slot portion and a surface path portion, the open slot portion including a home position and an engaged position;
- a spring biased rod pivotally connecting the plate and flipper; and
- a cam fixed to the connecting rod, the cam including a pin cooperatively movable along the closed loop;

and wherein the cable junction includes:
- a first cable holding portion attached to the connecting rod;
- a second cable holding portion; and
- a second biasing element connected to the first and second cable holding portions.

7. The mechanism of claim 6, wherein the mechanism is attached to a furniture supporting platform, the furniture supporting platform comprising a chassis, wherein the plurality of wheels is attached to an underside of the chassis, each wheel including a brake, wherein the plate is fixed to the chassis, and wherein the second cable holding portion is fixed to the chassis.

8. The mechanism of claim 6, wherein the activation subassembly is proximate the connecting rod first end.

9. The mechanism of claim 8, wherein the cable junction is proximate the connecting rod second end.

10. The mechanism of claim 7, wherein when the plurality of wheels are in the unlocked state, the first and second cable holding parts are parallel relative to each other.

11. The mechanism of claim 7, wherein when the plurality of wheels are in the locked state, the first and second cable holding parts are angled relative to each other.

12. The mechanism of claim 6, wherein the mechanism further includes a second pedal attached to an opposite end of the connecting rod from the pedal.

13. The mechanism of claim 6, wherein the furniture supporting platform comprises a chair.

14. The mechanism of claim 6, wherein the furniture supporting platform comprises a bed.

15. The mechanism of claim 6, wherein the furniture supporting platform comprises a table.

16. A braking mechanism comprising at least one pedal fixed to an end of a connecting rod, a flipper movable in X, Y and Z-directions and having a discontinuous track, a cam attached to the connecting rod and having a pin cooperatively movable within the discontinuous track, a cable junction attached to the connecting rod, and cables having one end attached to the cable junction and a second end engaging a wheel brake.

17. The braking mechanism of claim 16, wherein the discontinuous track comprises an open slot portion and a surface path portion, and wherein the open slot portion comprises a home position and an engaged position.

18. The braking mechanism of claim 17, wherein the mechanism operably engages at least one brake to transition at least one wheel between unlocked and locked states.

19. The braking mechanism of claim 18, wherein transitioning the at least one wheel from the unlocked state to the locked state comprises moving the pin along the open slot portion from the home position to the engaged position; and wherein transitioning the at least one wheel from the locked state to the unlocked state comprises moving the pin from the engaged position to the home position.

20. The braking mechanism of claim 19, wherein the flipper further comprises a ramp positioned between the open slot portion and surface path portion, and wherein the pin travels along the ramp from the open slot portion to the surface path portion.

* * * * *

UNITED STATES PATENT AND TRADEMARK OFFICE
CERTIFICATE OF CORRECTION

Page 1 of 1

| | |
|---|---|
| PATENT NO. | : 9,074,648 B2 |
| APPLICATION NO. | : 13/650255 |
| DATED | : July 7, 2015 |
| INVENTOR(S) | : Spoor et al. |

It is certified that error appears in the above-identified patent and that said Letters Patent is hereby corrected as shown below:

In the specification

Col. 1, line 34, after "number" insert -- of --

Col. 1, line 53, delete "is activated"

Col. 3, lines 38-39, "sub assembly" should be — subassembly —

Col. 4, line 34, "there through" should be — therethrough —

In the claims

Col. 6, claim 1, line 51, "," should be — ; —

Col. 6, claim 2, line 62, "Z directions" should be — Z-directions —

Signed and Sealed this
Second Day of February, 2016

Michelle K. Lee
*Director of the United States Patent and Trademark Office*